US007290752B2

(12) United States Patent
Keller

(10) Patent No.: US 7,290,752 B2
(45) Date of Patent: Nov. 6, 2007

(54) MOLD FOR THE PRODUCTION OF MOLDED PARTS ON A JOLTING TABLE

(75) Inventor: Gottfried Keller, Allmendingen (DE)

(73) Assignee: Rampf Formen GmbH, Allmendingen (DE)

( * ) Notice: Subject to any disclaimer, the term of this patent is extended or adjusted under 35 U.S.C. 154(b) by 376 days.

(21) Appl. No.: 10/972,960

(22) Filed: Oct. 25, 2004

(65) Prior Publication Data

US 2005/0056766 A1 Mar. 17, 2005

Related U.S. Application Data

(63) Continuation of application No. PCT/DE03/01070, filed on Apr. 2, 2003.

(30) Foreign Application Priority Data

May 3, 2002 (DE) ................................ 102 19 986

(51) Int. Cl.
*B29C 43/32* (2006.01)

(52) U.S. Cl. ...................... 249/120; 249/139; 249/165; 249/168; 425/185; 425/193; 425/456

(58) Field of Classification Search ................ 249/120, 249/129, 132, 139, 160, 163, 165, 166, 168; 425/185, 193, 195, 421, 456
See application file for complete search history.

(56) References Cited

U.S. PATENT DOCUMENTS

| | | | | |
|---|---|---|---|---|
| 3,932,098 | A * | 1/1976 | Huber et al. | 425/412 |
| 5,743,510 | A * | 4/1998 | Johnston | 249/155 |
| 6,007,321 | A * | 12/1999 | Meckel et al. | 249/139 |
| 2002/0134906 | A1* | 9/2002 | Braungardt et al. | 249/132 |

FOREIGN PATENT DOCUMENTS

| | | |
|---|---|---|
| DE | 27 10 643 A | 9/1978 |
| EP | 0 730 936 A | 9/1996 |
| EP | 0 738 204 B1 | 12/1997 |

* cited by examiner

*Primary Examiner*—Yogendra N. Gupta
*Assistant Examiner*—Thu Khanh T. Nguyen
(74) *Attorney, Agent, or Firm*—Burr & Brown

(57) ABSTRACT

The invention relates to a mold for the production of molded parts on a jolting table, the mold having a mold frame which carries a mold insert in which recesses defining the molded parts are formed, the mold insert being surrounded by a clearance space toward the mold frame, this clearance space being at least partly filled with damping means which keeps the mold frame and mold insert at a distance apart in a non-contact manner. In this case, at least one locking element passes through the clearance space, the locking element being mounted with play in at least one of the mold frame and mold insert.

26 Claims, 11 Drawing Sheets

MOLD FOR THE PRODUCTION OF MOLDED PARTS ON A JOLTING TABLE

CROSS REFERENCE TO RELATED APPLICATIONS

This application is a continuation of International Application No. PCT/DE03/01070 having an international filing date of Apr. 2, 2003, which designated the United States, and claims the benefit of German Application No. 102 19 986.8, filed May 3, 2002, the entireties of which are incorporated herein by reference.

FIELD OF THE INVENTION

The invention relates to a mold for the production of molded parts. More specifically, the invention relates to a mold including a mold frame and a mold insert held together, with play, by at least one locking element.

BACKGROUND OF THE INVENTION

DE 27 10 643 A1 discloses a device for fastening molds, this device being subjected to vibrations. In this case, provision is made for the table or for an underframe welded to the table to be connected to a mold in a positive-locking manner, the mold having an encircling elastic strip. The latter forms the contact surface between the mold and the table. A disadvantage with such a mold is that the elastic strip, when the mold is being handled, is subjected in an unprotected manner to the impact and friction loads which occur. Furthermore, such a mold requires a special table, since the latter must have a flange which is suitable for the positive-locking fastening of the mold.

Furthermore, EP 0 738 204 B1 discloses a mold for producing concrete parts which is intended for assembling on a jolting table. This mold consists of a multiplicity of identical mold boxes which are arranged in a mold frame, the intermediate spaces between the individual mold boxes and the mold frame being filled by cast-in material which has elastic properties. A disadvantage of such a mold is that the mold boxes are held in the mold frame solely by the elastic material, and the mold boxes lying in the center region of the mold can be displaced more easily against the mold frame than the mold boxes lying in the edge regions. Furthermore, complicated devices are required for the production of the mold in order to hold the mold boxes in position during the production process.

EP 0 730 936 B1 of the generic type discloses a vibrating mold which consists of a mold frame connected to a molding machine and of an insert mounted in said mold frame and having mold nests. In this case, mold frame and insert interlock by means of projections and recesses, damping means being provided between the opposite surfaces of interacting projections and recesses. There is therefore a positive-locking, damped connection between the mold frame and the insert. The production of the mold and of the insert is very expensive on account of the complicated geometry.

SUMMARY OF THE INVENTION

The object of the invention is to develop a mold for the production of molded parts on a jolting table, which mold has a simple geometry, is simple to produce and assemble, and nonetheless reliably prevents release of the mold insert from the mold frame and thus meets the most stringent requirements with regard to safety.

The mold according to the invention has at least one locking element which passes through the clearance space between the mold frame and the mold insert and is mounted with play in the mold frame and/or in the mold insert. This provides for locking during operation and handling, which reliably prevents the mold insert from falling out of the mold frame or reliably prevents the mold insert from dropping relative to the mold frame without assuming an active function or influencing the vibration behavior of the mold during operation or during the handling of the mold. Due to the more or less load-free mounting of the locking element between the mold insert and the mold frame, the operability of the locking element in an emergency is in all probability ensured. This protective mounting of the locking element therefore also enables the locking element to be dimensioned to be small and cost-effective, since it is generally not subjected to any continuous loads reducing the service life.

A special embodiment provides for the locking element to be mounted in the mold insert and/or in the mold frame in a freely floating manner with play in all spatial directions. Such mounting of the locking element can be achieved for example by completely encasing the locking element with a vibration-damping material, for example a foam. The advantage of a mounting which has play in all spatial directions is that the locking element requires no special adaptation to the mold insert or the mold frame. A requisite adaptation is possible in a simple manner by means of the damping material which surrounds the locking element.

A further special embodiment provides for the degrees of freedom which are required for mounting the locking element free of play to be distributed over the mold insert and the mold frame. It is thereby possible to spread the costs for processing the mold over the mold insert and the mold frame, since both components provide at least one degree of freedom.

Furthermore, the invention provides for the locking element to be designed in such a way that it can be pushed into and out of an offset or can be pushed in and out under a step which is formed on the mold insert or on the mold frame. In this way, the fitting and removal of the locking element is possible in a simple manner. Alternatively, provision is also made for the locking element to be designed in such a way that it can be pushed onto a projection and can be pulled off a projection. This makes it possible in a simple manner to realize “positive locking” with play, which provides for locking against undesirably large movements during operation.

A special embodiment of the invention provides for a locking stud to be used as locking element, at least a region of this locking stud preferably having a threaded section and being rotatably mounted via the latter in a tapped hole present in the mold frame. Such a locking stud, in the same way as the tapped hole accommodating it, can be produced in a cost-effective manner and permits a simple, sensitive adjustment.

Furthermore, the invention provides for the locking element to be secured against a change in position of the first locking element by a further locking element. This ensures that predetermined play is maintained for prolonged operating periods.

According to a special embodiment, provision is made for the second locking element to be designed as a lock nut which can be secured against the mold frame via a thread located on the locking stud and restrains the locking stud against the mold frame. For such a design, recourse may be had to cost-effective standard components.

A special embodiment of the subject matter of the invention provides for the locking element to be provided with a conical point which enters a conical hole of the mold insert. In this way, mounting with play can be produced in a simple manner, in which mounting, if the play is exceeded, contact between the locking element and the mold insert takes place at surfaces free of edges.

Furthermore, provision is made for a gap to be formed between the mold insert and the mold frame by the clearance space, which gap runs approximately perpendicularly to a bearing surface of the mold. In this way, uniform damping of the mold insert is achieved in particular in directions running parallel to a bearing surface of the jolting table.

Furthermore, provision is made for the gap, as viewed in cross section, to be configured with widened portions and narrowed portions. This makes it possible to realize positive-locking connections between the vibration-damping means and the mold frame, and between the vibration-damping means and the mold insert, these positive-locking connections being necessary for cohesion of the mold.

The invention provides for the gap to have a region which, as viewed in cross section, is approximately rectangular and perpendicularly disposed and which is penetrated by neither the mold frame nor the mold insert. In this way, the mold insert and the mold frame are kept at a distance apart in such a way that the mold frame can be inserted into and removed from the mold frame in a direction disposed perpendicularly to the bearing surface of the mold without touching said mold frame. This enables the mold frame and the mold insert to in each case be designed in one piece and thus in a cost-effective manner.

An embodiment variant of the invention provides for at least a region of the clearance space between the mold frame and the mold insert to be filled with a vibration-damping means, which is preferably injected and, at the bearing surfaces relative to the mold frame and the mold insert, forms an adhesively bonding connection with these components. This increases the suitability of the damping means for damping vibrations, since said damping means, due to the adhesively bonded connections, is now able to absorb shearing loads and tensile loads to an increased extent.

Furthermore, provision is made for the mold insert to be held in the mold frame solely by adhesively bonded connections acting between the mold insert and the vibration-damping means and between the mold frame and the vibration-damping means, without having recourse to supporting positive-locking connections between the damping means and the mold insert and between the damping means and the mold frame. In this way, it is possible to keep the volume of the vibration-damping means to a minimum and thus permit cost-effective, elastic embedding of the mold insert in the mold frame, which embedding is also simple to fill on account of the simple geometry.

Furthermore, provision is made for the locking elements to be used as centering aids when the clearance space is being filled with the vibration-damping means, which centering aids keep the mold insert in a predetermined position with regard to the mold frame. In this way, it is possible to dispense with complicated devices for centering the mold insert in the mold frame and to configure the production process in a cost-effective manner.

Furthermore, the invention provides for the locking elements to be disengaged during maintenance or dismantling of the mold insert from the mold. This makes it possible, without the risk of a collision, to press the mold insert out of the mold frame or to cut the mold insert from the mold frame by cutting out the vibration-damping means.

Between the mold frame and the mold insert, play of about 0.5 mm to 1.5 mm possible in all spatial directions is provided for operation. This ensures that the plungers engaging in the mold insert are not damaged by excessive free vibration of the mold insert.

Finally, in order to simplify assembly and dismantling, provision is made for the mold insert to be pushed into and out of a recess of the mold frame by a rectilinear movement. In this way, quick and cost-effective assembly is possible.

BRIEF DESCRIPTION OF THE DRAWINGS

Further details of the invention are described in the drawing with reference to schematically illustrated exemplary embodiments.

DETAILED DESCRIPTION OF THE INVENTION

Figure 1:
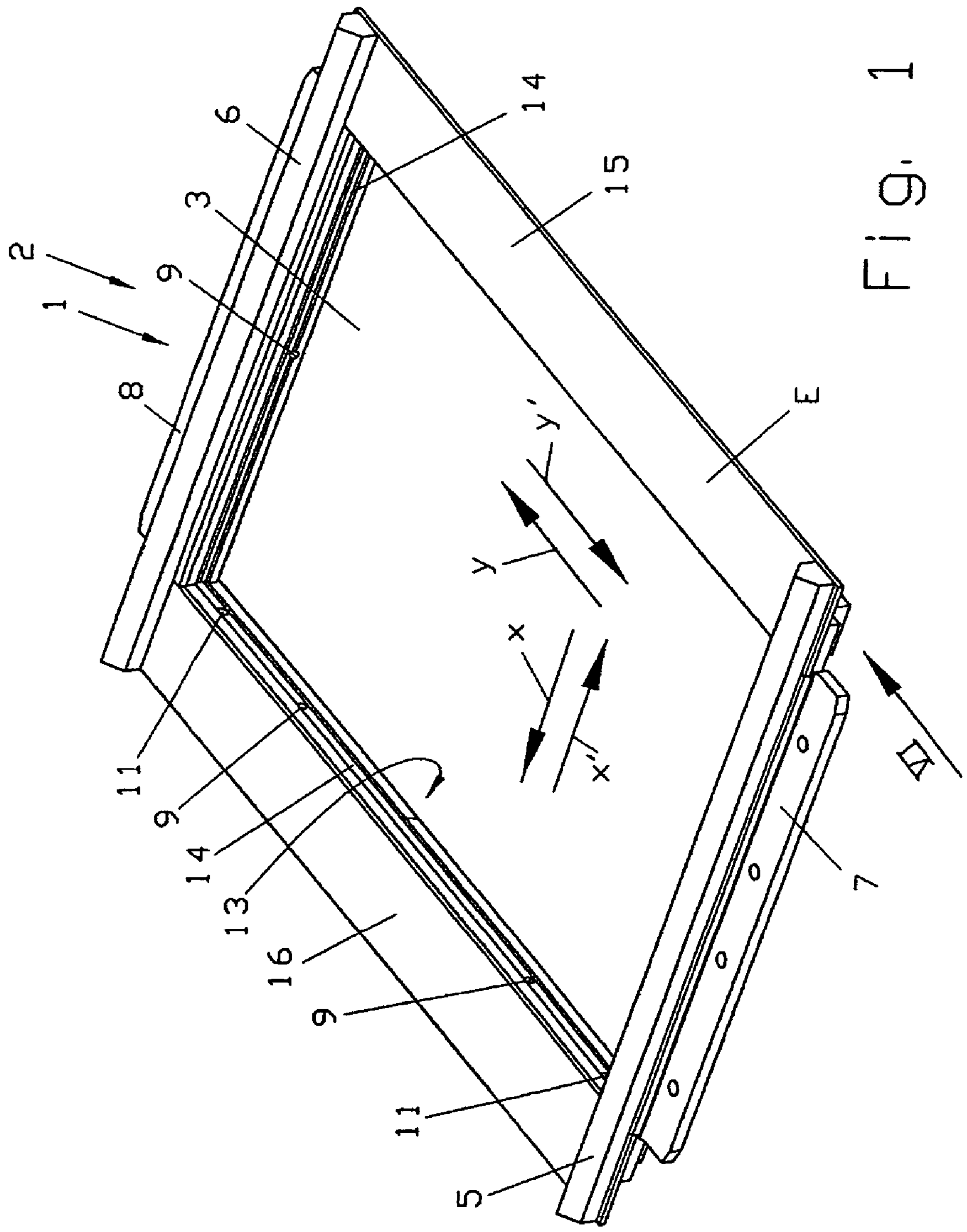
FIG. 1 shows a perspective view of a mold frame.

A mold frame 1, which is an integral part of a mold 2, is shown in perspective view in FIG. 1. The mold frame 1 has a rectangular aperture 3 which is provided for the use of a mold insert 4 (see FIG. 2). At the side of the aperture 3, the mold frame 1 has strips 5, 6 which serve to guide a filling carriage (not shown) during operation of the mold 2. Flanges 7, 8 lie parallel to the strips 5, 6. The mold frame 1 or the entire mold 2 is fastened to a jolting table (not shown) by means of these flanges 7, 8. Furthermore, the mold frame 1 has holes 9 which run in arrow directions x or x' and y or y' and through which a curing vibration-damping means 10 (see, for example, FIG. 7) can be injected in the direction of the aperture 3. Further holes 11 made on the mold frame 1 in the arrow direction x or x' are provided for the passage of locking elements 12 (see, for example, FIG. 7). An encircling inner wall 13 of the mold frame 1, which inner wall 13 is oriented relative to the rectangular aperture 3, has an encircling groove 14, into which the holes 9, 11 open. When the mold insert 4 is fitted, surfaces 15, 16 of the mold frame 1 lie flush with a top side 17 (see FIG. 2) of the mold frame 4 in a common plane E.

Figure 2:
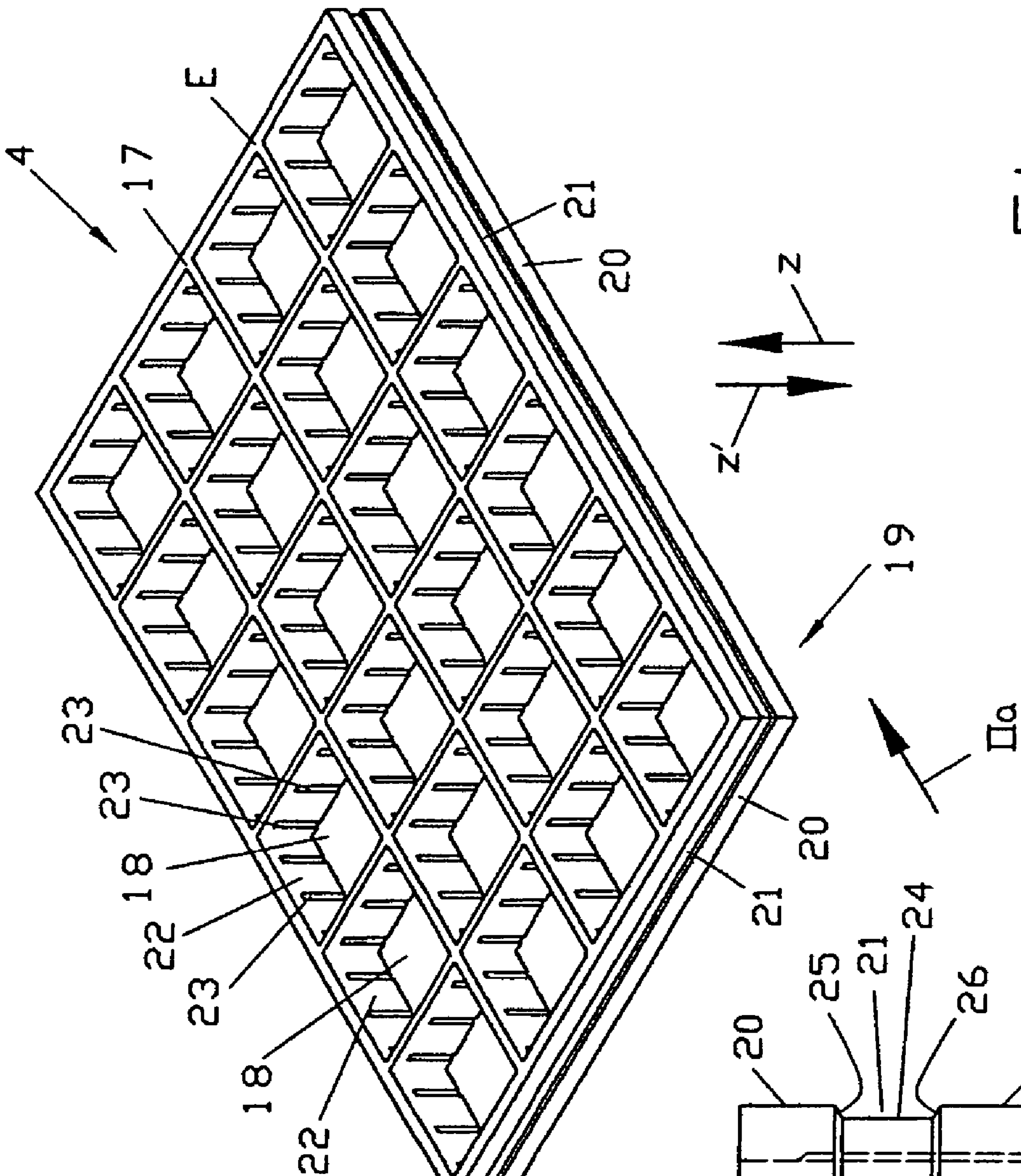
FIG. 2 shows a perspective view of a mold insert.

The mold insert 4 is shown in perspective view in FIG. 2. The mold insert 4 is designed as a one-piece component and has 24 recesses 18 which are provided for the production of molded parts (not shown), such as concrete blocks and concrete panels for example. On the outside, the mold insert 4 is defined by the top side 17, an underside 19 opposite the latter, and an encircling outer wall 20. The outer wall 20, which in the assembled state of the mold 2 is opposite the inner wall 13 (see FIG. 1) of the mold frame 1, has an encircling groove 21. Encircling inner walls 22 form the recesses 18, the inner walls 22 being formed with grooves 23 which run in an arrow direction z or z' and serve to form lugs on the molded parts (not shown).

Figure 2A:
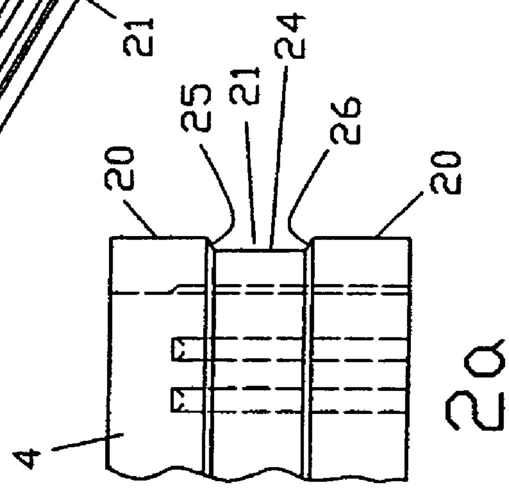
FIG. 2*a* shows a side view of the mold frame shown in FIG. 2 from an arrow direction IIa.

A side view in an arrow direction IIa of the mold insert 4 shown in FIG. 2 is shown in FIG. 2*a*. The groove 21 set back from the outer wall 20 can clearly be seen in this view. The groove 21 has a groove bottom 24 which runs parallel to the outer wall 20 and merges into the outer wall 20 via bevels 25, 26.

Figure 3:
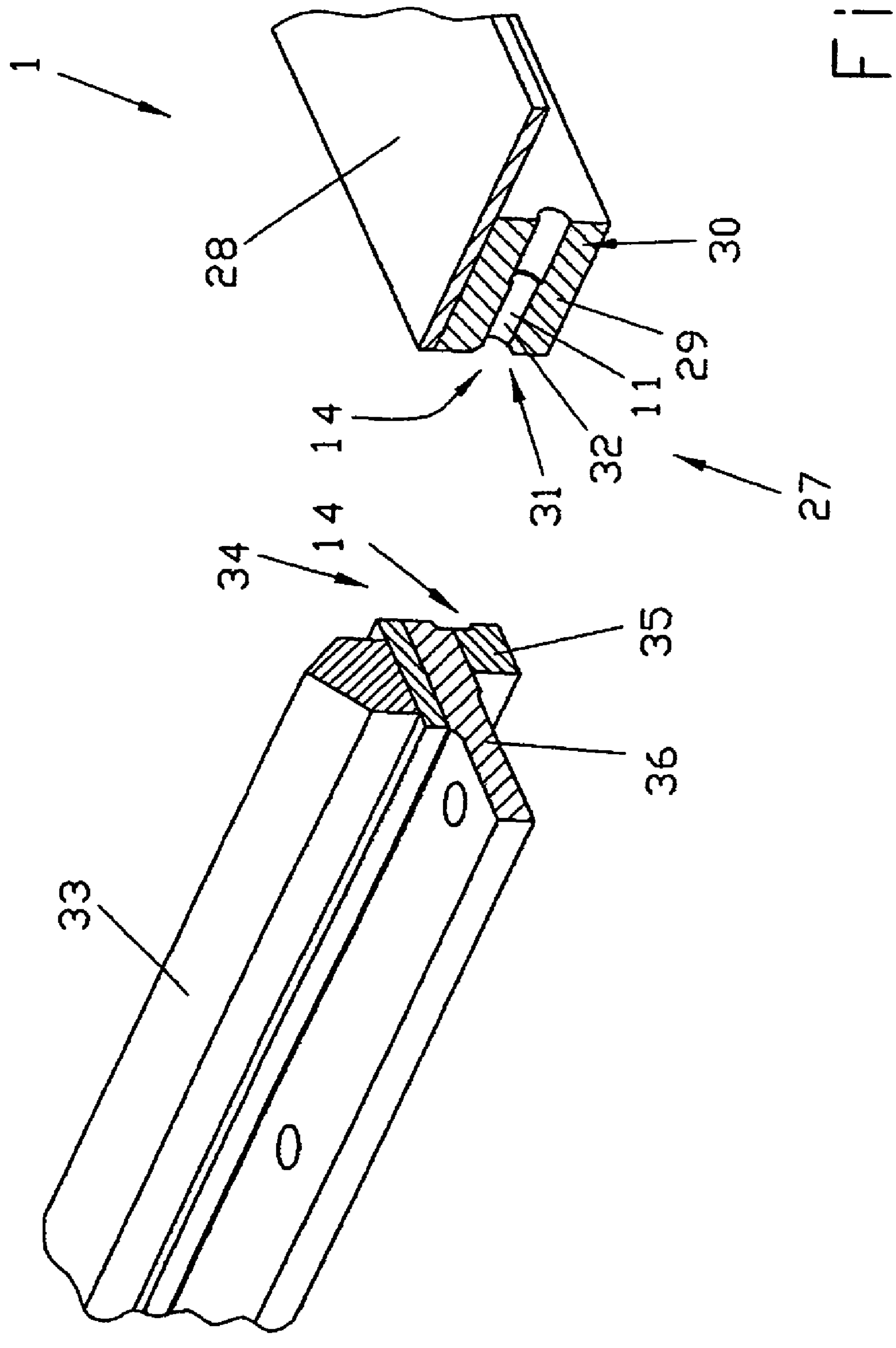
FIG. 3 shows a detail of the mold frame shown in FIG. 1 in cutaway illustration.

A detail of the mold frame 1 shown in FIG. 1 is shown enlarged in FIG. 3 and in a cutaway section in a corner region 27. The groove 14, which runs concealed in FIG. 1 in the corner region 27, can be seen in this view. Furthermore, it can also be seen from this view that the groove 14 is milled in a one-piece lower spar 29 in the region of transverse legs 28 of the mold frame 1. Furthermore, the section through the lower spar 29 runs in the region of one of the holes 11 for one of the locking elements (not shown). In an inlet region 30, the hole 11 has, for example, a diameter of 20 mm. In an outlet region 31, the hole 11 is made as a tapped hole 32, which is designed, for example, as an M16 thread. The section through a longitudinal leg 33 of the mold frame 1 shows that the groove 14 in the region of the longitudinal leg 33 is directed in a transition region 34 of two longitudinal spars 35, 36.

Figure 4:
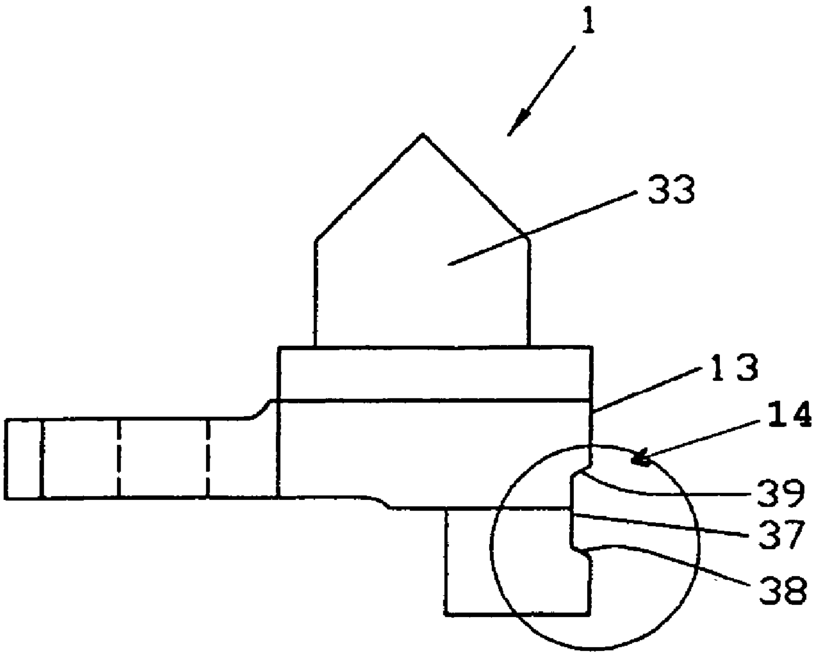
FIG. 4 shows a section through the mold frame shown in FIG. 1 along section line IV-IV.

A section through the mold frame, shown in FIG. 1, along a section line IV-IV or a plan view of the sectional area, which can be seen in FIG. 3, of the longitudinal leg 33 is shown in FIG. 4. For the sake of clarity of the illustration, hatching of the sectional areas has been dispensed with. The groove 14 has a groove bottom 37, which merges into the inner wall 13 of the mold frame 1 via bevels 38, 39.

Figure 5:
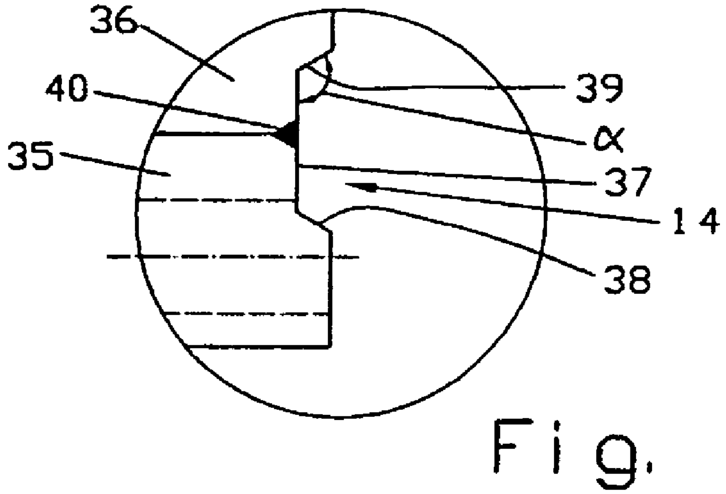
FIG. 5 shows an enlarged detail of the sectional illustration depicted in FIG. 4.

The groove 14 shown in FIG. 4 is again shown enlarged in FIG. 5. The bevels 38, 39 have an opening angle $\alpha$ of about 120° relative to the groove bottom 37. The two longitudinal spars 35, 36, in the region of which the groove 14 is formed, meet at the groove bottom 37. A section of the groove bottom 37 of the groove 14 is formed by a weld 40, by means of which the longitudinal spars 35, 36 are fixed relative to one another.

Figure 6:
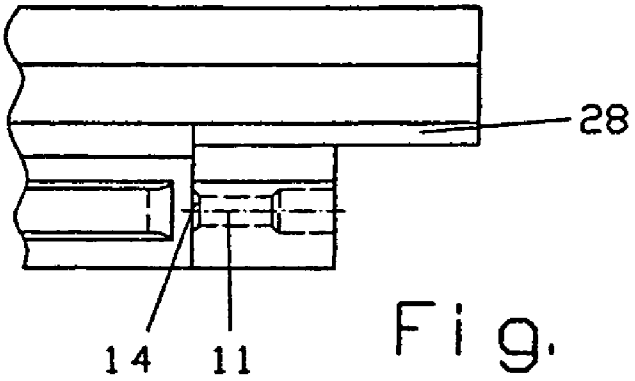
FIG. 6 shows a side view of the mold frame shown in FIG. 1 from an arrow direction VI.

A side view of the mold frame 1 shown in FIG. 1 is depicted in FIG. 6 from the arrow direction VI. The hole 11 which passes through the transverse spar 29 and opens into the groove 14 can be seen in this illustration.

Figure 7:
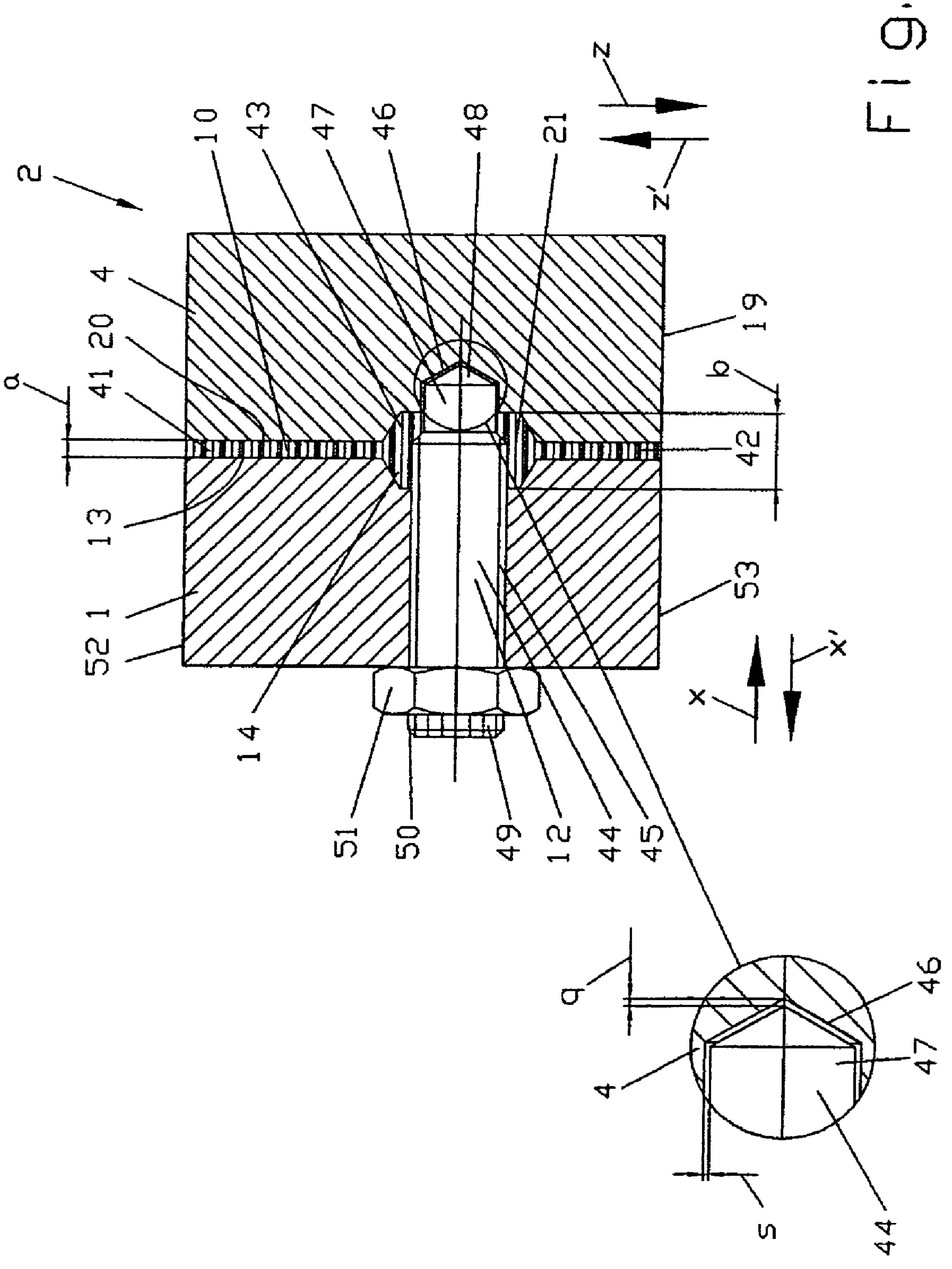
FIG. 7 shows a simplified section through a mold, composed of the mold frame shown in FIG. 1 and of the mold insert shown in FIG. 2, in the region of a locking element.

A detail of the mold 2 assembled from the mold frame 1 known in FIG. 1 and from the mold insert 4 known from FIG. 2 is depicted in FIG. 7 in a sectional illustration. The mold frame 1 and the mold insert 4 lie opposite one another with the inner wall 13 and the outer wall 20. Located between the inner wall 13 and the outer wall 20 is a clearance space 41 which encircles the mold insert 4 and is filled by the vibration-damping means 10. The clearance space 41 forms a gap 42 running in the arrow direction z or z' or perpendicularly to an underside 19 or bearing surface of the mold insert 4. In the region of the opposite grooves 14, 21 of the mold frame 1 and of the mold insert 4, the gap 42 has a widened portion 43 from a gap width a to a gap width b. In the region of the widened portion 43, the locking element 12, which is designed as a locking stud 44 having a threaded section 45, passes through the clearance space 41 into an offset 46 provided in the mold insert 4. The locking stud 44 has the shape of a cone 48 in an end region 47. In its end region 49 opposite the end region 47, the locking stud 44 has a further thread 50 which is provided for the guidance of a lock nut 51. By means of this lock nut 51, the locking stud 44 can be secured to the mold frame 1 in a desired position and is thus locked against a change in the desired position. In a detailed illustration of FIG. 7, the offset 46 in the mold insert 4 and the end region 47 of the locking stud 44 are shown enlarged. It can be seen from this enlarged illustration that there is play having the dimensions q and s between the locking stud 44 and the mold insert 4 in the arrow directions z or z' and x or x'. Likewise provided is play (not shown in FIG. 7) of the magnitude r in the arrow directions y and y', respectively, which run into the drawing plane and respectively out of the drawing plane. The locking stud 44 and thus also the mold frame 1 are thus mounted in a freely floating manner relative to the mold insert 4 with play q, r, s in all spatial directions. Defined positioning of the mold insert 4 relative to the mold frame 1 is possible by shifting the locking stud 44 in the arrow direction x against the mold insert 4, together with at least one further locking means or another aid. Such positioning of the mold insert 4 is provided during the production of the mold 1 at the instant at which the vibration-damping means 10 is introduced into the clearance space 41. By covering the clearance space 41 at a top side 52 and an underside 53 of the mold 2, it is then possible for the clearance space 41 to be filled by the injection of a vibration-damping means 10. In the process, the vibration-damping means 10 is forced through the holes 9 (see FIG. 1) into the clearance space 41. Escape of the vibration-damping means 10 from the holes 11 (see FIG. 1) is prevented by the screwed-in locking elements 12, which at least partly hold the mold insert 4 in position relative to the mold frame 1. For the transport of the finished mold 2, it is possible to leave the locking elements 12 in the clamping position described. Before the mold 2 is put into operation, provision is then made for the locking elements 12 or locking studs 44 to be shifted from the clamping position into the working position shown in FIG. 7. In the exemplary embodiment shown in FIG. 7, this is done by turning back the locking stud 44 by a predetermined number of degrees, so that the desired play is achieved. In the working position shown in FIG. 7, free vibration of the mold insert 4 relative to the mold frame 1 is possible in all spatial directions within the range of the set play without the locking element 12 being subjected to appreciable loading in the process. For the maintenance or general overhaul of the mold 1, provision is made for the locking element 12 to be pulled back in the arrow direction x' from the mold insert 4 and the clearance space 41 into the mold frame 1 in order to be able to subsequently release the mold insert 4 from the mold frame 1 by pressing the latter out or by cutting out the vibration-damping means 10. After that, provision is made for carrying out maintenance work and then for reconnecting the mold frame and the mold insert in the manner described.

Figure 8:
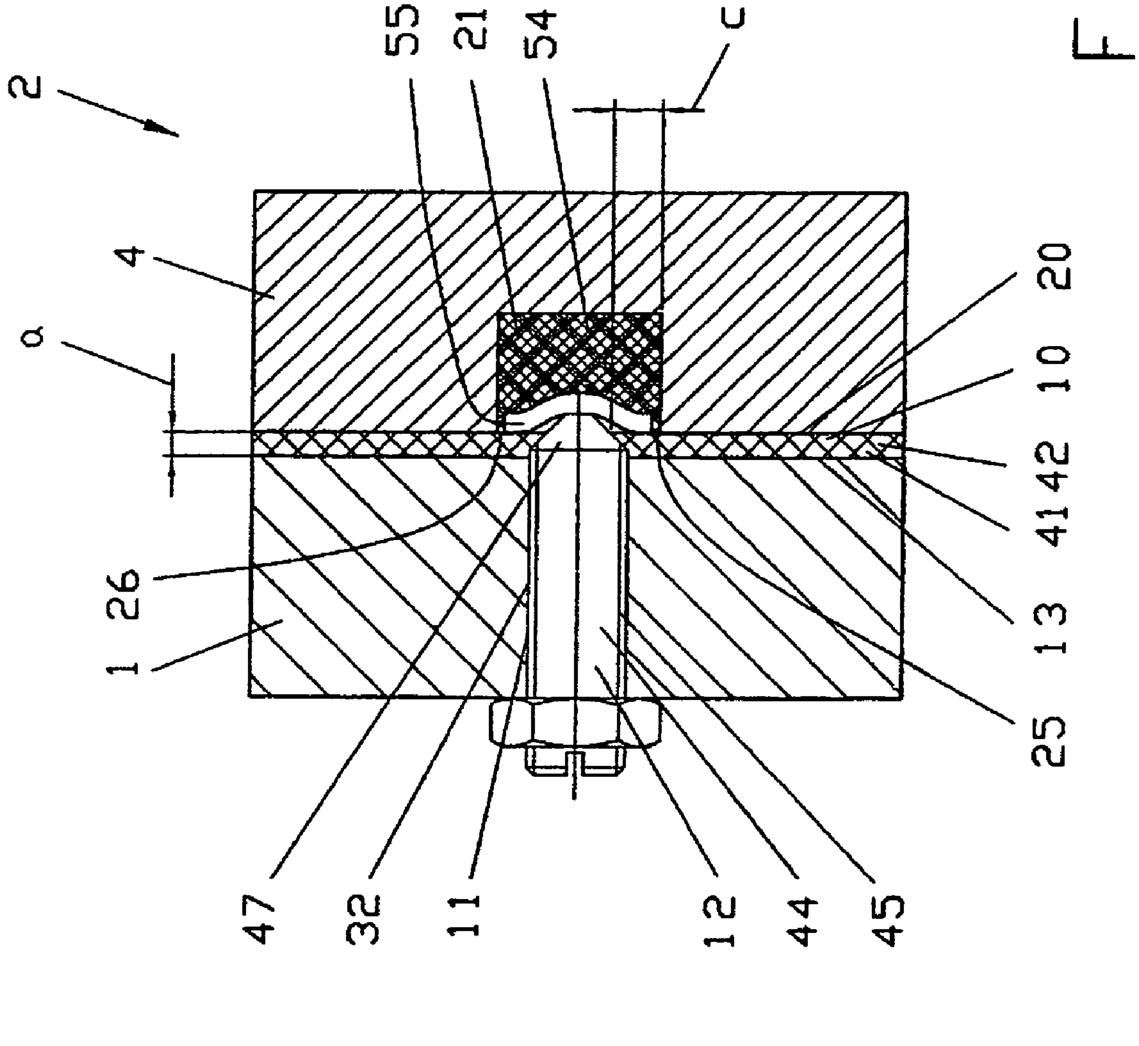
FIG. 8 shows a section through a second mold.

A detail of a second mold 2 is depicted in a sectional representation in FIG. 8. Lying between a mold frame 1 and a mold insert 4 is a clearance space 41 which is formed as a gap 42 having a constant width a. The gap 42 is filled with a vibration-damping means 10, which has an adhesively bonded connection over a large area with an inner wall 13 of the mold frame 1 and an outer wall 20 of the mold insert 4. As locking element 12, a locking stud 44 having a thread 45 is mounted in a hole 11 of the mold frame 1, this hole 11 being made as a tapped hole 32. The locking stud 44 passes through the vibration-damping means 10 in the region of a groove 21 formed in the mold insert 4. The groove 21 is filled with an elastic material 54, for example a rubber, and is closed off from the vibration-damping means 10 by a diaphragm 55 which covers the groove 21. The diaphragm 55, rubber-mounted in this way, allows an end region 47 of the locking stud 44 to penetrate into the groove 21. If the retaining effect of the vibration-damping means 10 fails when the mold 2 is lifted at the mold frame 1 or at the mold insert 4, the locking element 12 acts as a means of preventing components from falling through, this means allowing maximum sagging of the mold frame 1 or of the mold insert 4 by a distance c until the locking stud 44 bears in its end region 47 against an edge 25 or 26 of the groove 21.

Figures 9, 10:
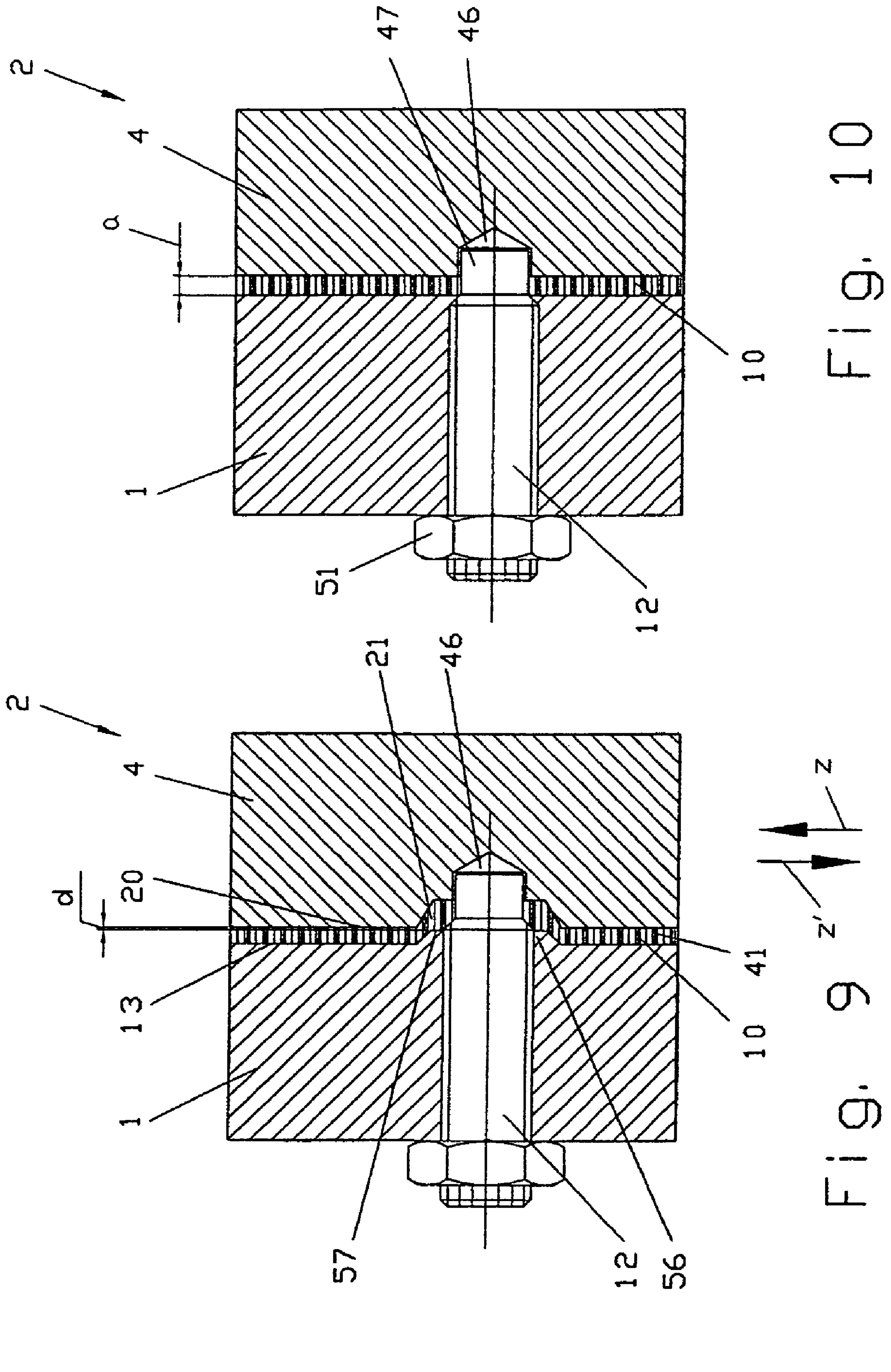
FIG. 9 shows a section through a third mold.
FIG. 10 shows a section through a fourth mold.

A detail of a third mold 2 is depicted in a sectional illustration in FIG. 9. Lying between a mold frame 1 and a mold insert 4 is a clearance space 41 which is filled with a vibration-damping means 10. At an outer wall 20, the mold insert 4 has a groove 21, opposite which is a projection 56 which is formed on an inner wall 13 of the mold frame 1. The mold insert 4 is positioned relative to the mold frame 1 in such a way that a top surface 57 of the projection 56, which top surface 57 runs parallel to the outer wall 20 of the mold insert 4, is at a distance d from said outer wall 20. The distance d between the two surfaces 57, 20 allows the mold insert 4 to be removed from the-mold frame 1 in a direction z or z' for assembly and dismantling. Displaceably mounted in the mold frame 1 is a locking element 12, which engages in an offset 46 of the mold insert 4 in an already known manner, in which case the locking element 12, in the operating position shown in FIG. 9, does not bear against the mold insert 4 but has all-round play.

FIG. 10 shows a detail of a fourth mold 2 in a sectional illustration. In a similar manner to the mold shown in FIG. 8, the vibration-damping means 10 lies in a gap 42 of uniform width a between a mold frame 1 and a mold insert 4. In a similar manner to the molds shown in FIGS. 7 to 9, an end region 47 of a locking element 12 engages in an offset 46 made in the mold insert 4, there being all-round play between the locking element 12 and the mold insert 4. The locking element 12 is secured against unintentional displacement by a lock nut 51.

Figure 11:
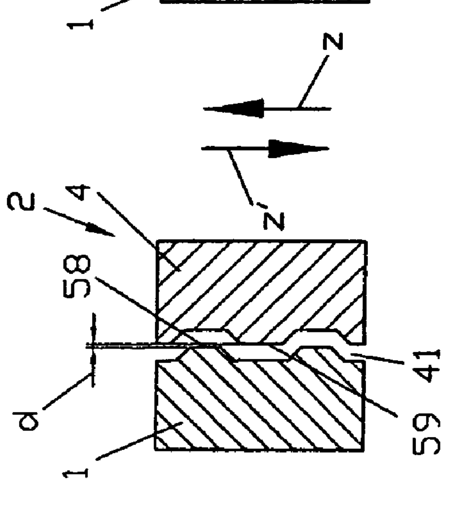
FIGS. 11 to 18 show a simplified sectional illustration through further molds.
Figure 12:
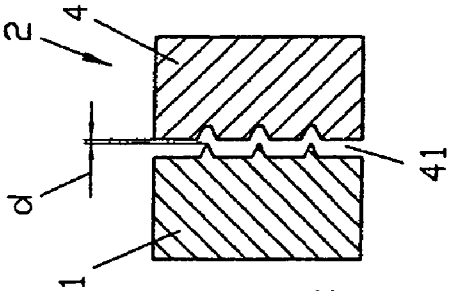
Figure 13:
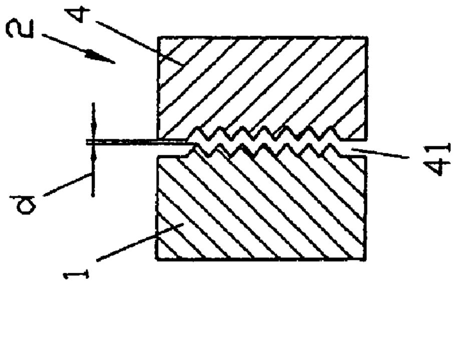
Figure 14:
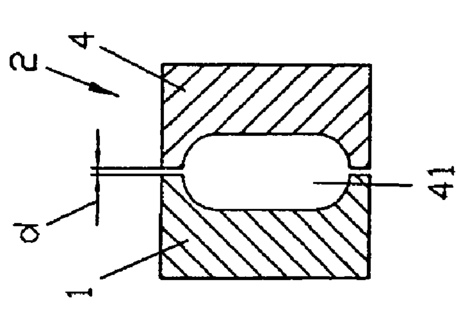
Figure 15:
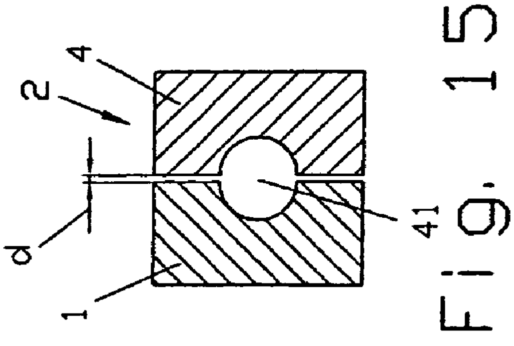
Figure 16:
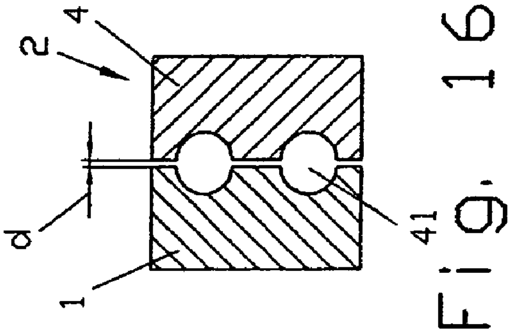
Figure 17:
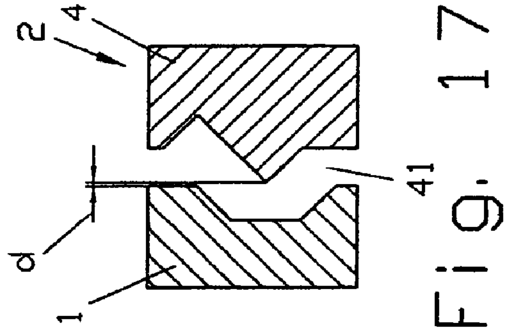
Figure 18:
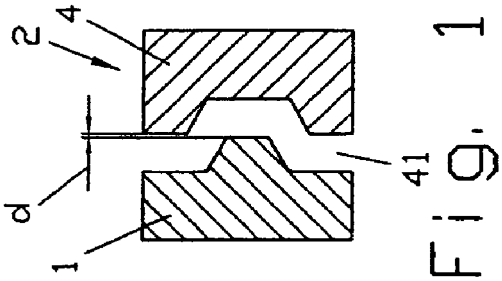

Further exemplary embodiments for the design of a clearance space 41 between a mold frame 1 and a mold insert 4 of a mold 2 are shown in FIGS. 11 to 18. A common feature of all the embodiment variants is the fact that the mold frame 1 and the mold insert 4 are displaceable relative to one another in arrow directions z, z' without coming into contact. That is to say that those surfaces 58, 59 of the mold frame 1 and of the mold insert 4 which are nearest to and opposite one another are at least at a distance d apart which allows collision-free removal of the mold insert 4 from the mold frame 1. The embodiment variants shown in FIGS. 11 to 13 are optimized in terms of ensuring, at a minimum gap volume, a large contact area between the mold frame 1 and the vibration-damping means (not shown) or respectively between the mold insert 4 and the vibration-damping means (not shown). FIGS. 14-16 are optimized in terms of arranging larger quantities of the vibration-damping means between the mold frame 1 and the mold insert 4 in such a way that said vibration-damping means is protected from external influences. Finally, FIGS. 17 and 18 show embodiment variants of molds 2 which permit greater freedom of vibration for the mold insert 4 on account of larger gap widths. Furthermore, the embodiment variants shown in FIGS. 17 and 18 are also suitable for the use of a vibration-damping means having lower hardness.

Figure 19:
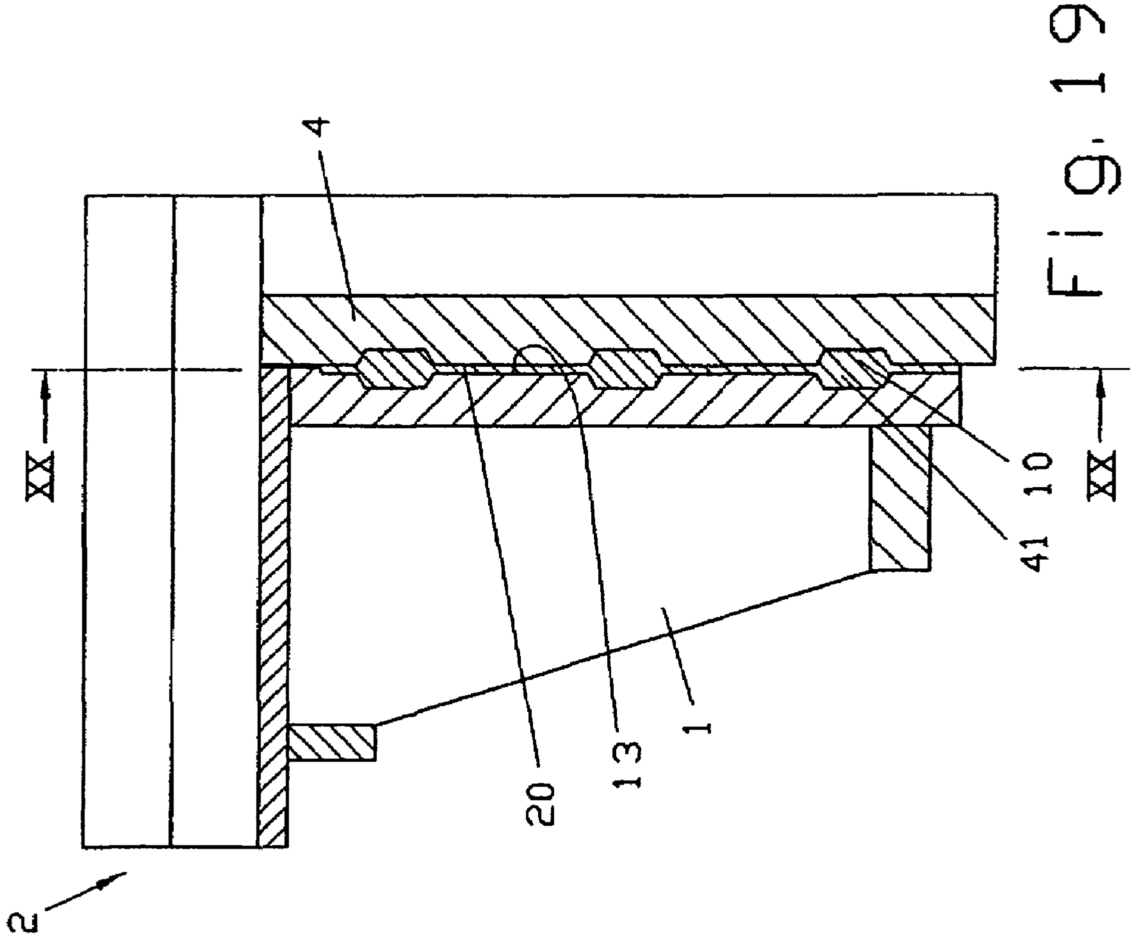
FIG. 19 shows a section through a further mold.

A section through a further mold 2 is shown in FIG. 19. The section is shown in an edge region in which a mold frame 1 and a mold insert 4 lie opposite one another with an inner wall 13 and an outer wall 20. Located between the inner wall 13 and the outer wall 20 is a clearance space 41 which encircles the mold insert 4 and is filled with a vibration-damping means 10.

Figure 20:
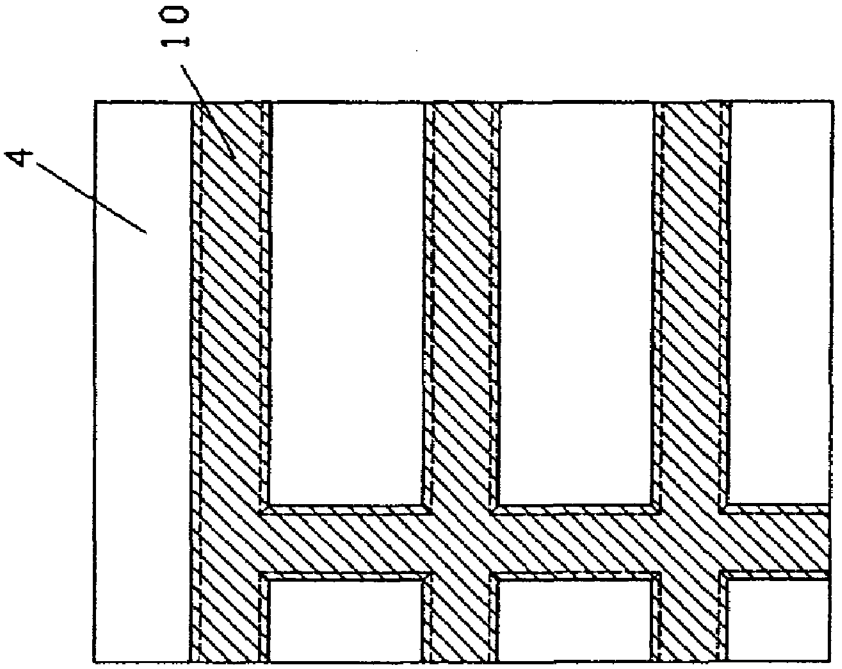
FIG. 20 shows a section through FIG. 19 along section line XX-XX.

A section through FIG. 19 along the section line XX-XX is shown in FIG. 20. The lattice-shaped arrangement of the vibration-damping means 10 between the mold frame 1 and the mold insert 4 can be seen in this view.

Figure 21:
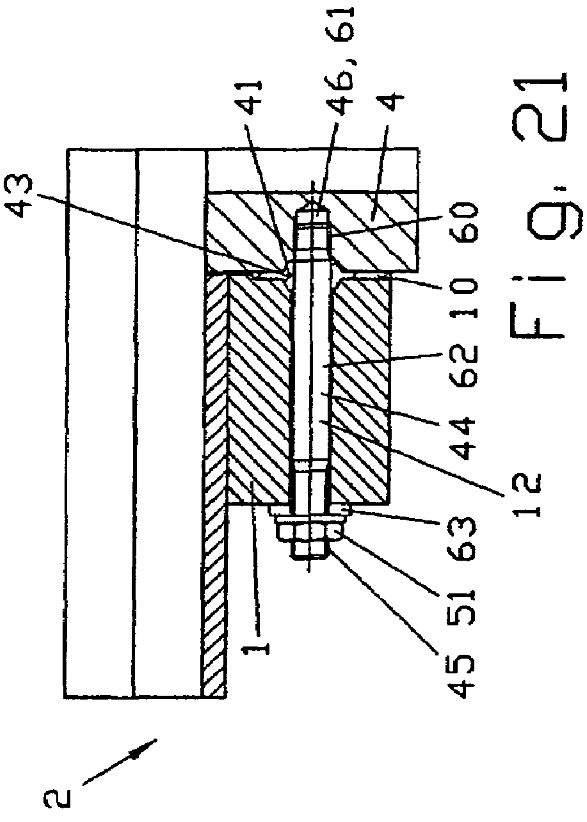

A section through the mold 2 shown in FIGS. 19 and 20 is shown in FIG. 21, this section showing the arrangement of a locking element 12. In the region of a widened portion 43 of the vibration-damping means 10, the locking element 12, which is designed as a locking stud 44 having two threaded sections 45, 60, passes through the clearance space 41 into an offset 46 provided in the mold insert 4. The offset 46 is made as a tapped hole 61. The locking element 12 serves as a tension screw 62 which pulls the mold insert 4 against the mold frame 1. To this end, the locking element 12 is screwed with its threaded section 60 into the tapped hole 61 made in the mold insert 4. The locking element 12 is supported on the mold frame 1 via a lock nut 51, which is screwed onto the threaded section 45. Arranged between the lock nut 51 and the mold frame 1 is a damping means 63 which isolates the locking means 12 from the mold frame 1, through which the latter is directed with play.

Figure 22:
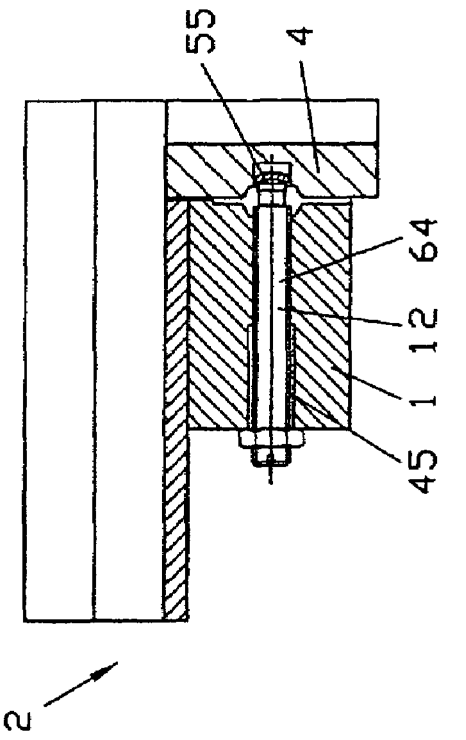
FIGS. 21 to 23 show sections through the mold shown in FIGS. 19 and 20 in the region of various locking elements.

A further locking means 12 for use in the mold 2 shown in FIGS. 19 and 20 is shown in FIG. 22. This locking means 12 is a pressure screw 64 which is screwed by means of a threaded section 45 to the mold frame 1 and presses against the mold insert 4 with a diaphragm 55 in between.

Figure 23:
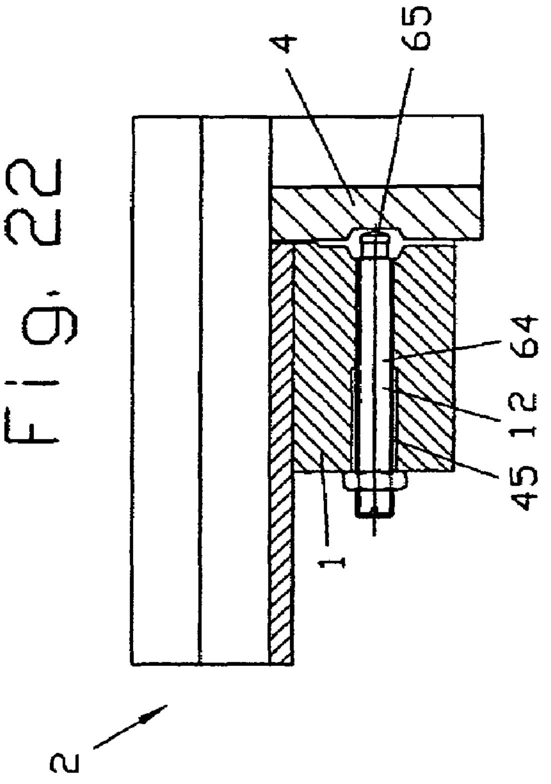

Yet another locking means 12 for use in the mold 2 shown in FIGS. 19 and 20 is shown in FIG. 23. This locking means 12 is again a pressure screw 64 which is screwed by means of a threaded section 45 to the mold frame 1 and presses on the mold frame 4 by means of a rounded-off pressure surface 65.

Figure 25:
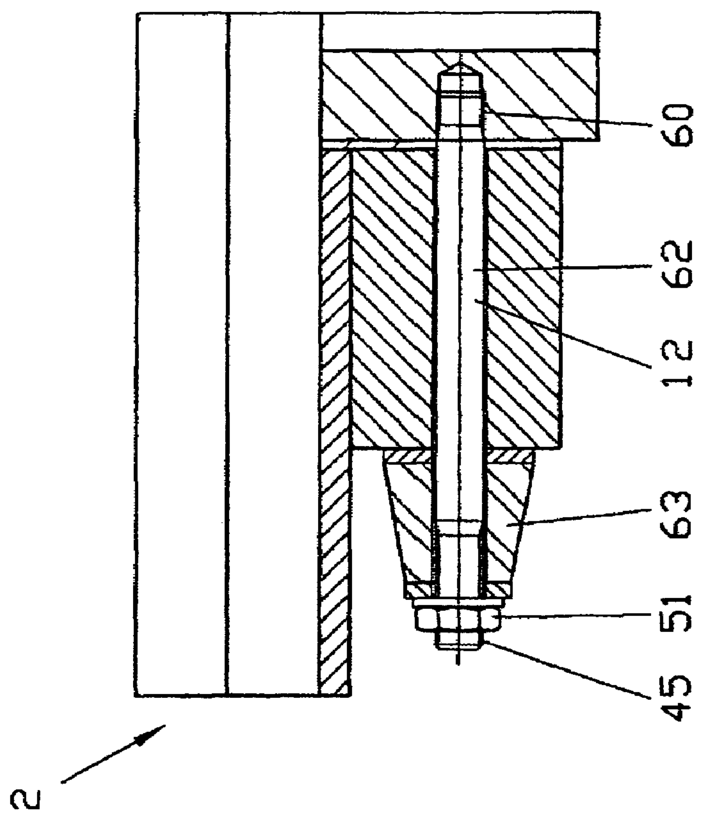
FIGS. 24 and 25 show sections in the region of locking elements.
Figure 24:
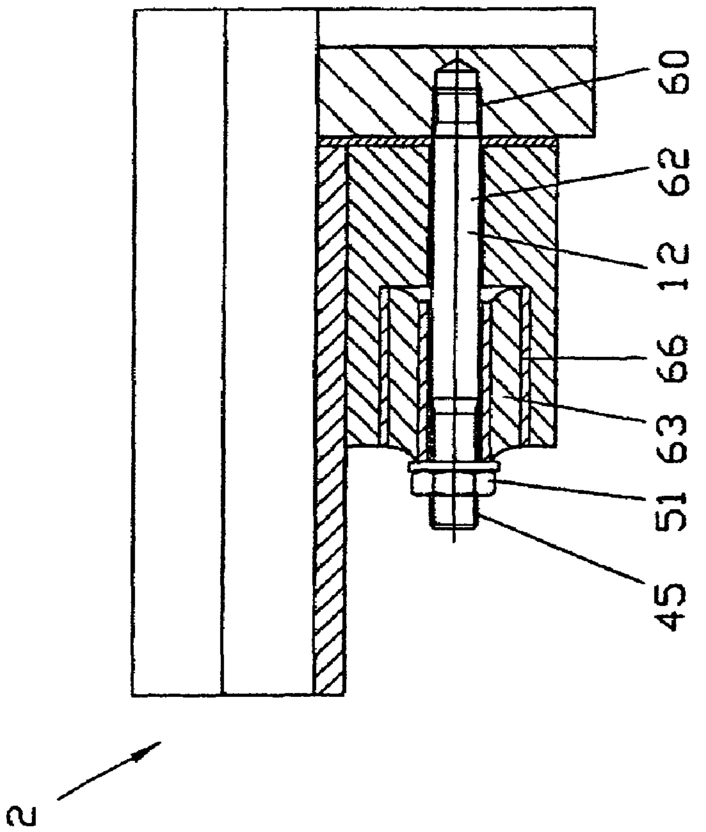

Further sections through further molds 2 in the region of locking means 12 are shown in FIGS. 24 and 25. The locking means 12 are designed as tension screws 62 and each have two threaded sections 45, 60. The tension screws 62 are each screwed by means of the threaded section 60 to the mold insert 4. The tension screws 62 are directed with play through the mold frame 1 and are elastically supported on the latter by damping means 63 being interposed, a lock nut 51 which interacts with the threaded section 45 serving for the support. The damping means 63 is designed as a vibration bush 66 in FIG. 24.

The invention is not restricted to the exemplary embodiments shown or described. On the contrary, it comprises developments of the invention within the scope of the patent claims. In particular, the invention also provides for only regions of the clearance space between the mold frame and the mold insert to be filled with damping means. Furthermore, provision is made for using damping means of different properties between the mold frame and the mold insert.

List of Designations:

1 Mold frame
2 Mold
3 Rectangular aperture
4 Mold insert
5, 6 Strip on 1
7, 8 Flange on 1
9 Hole in 1
10 Damping means/vibration-damping means
11 Hole for 12 in 1
12 Locking element
13 Inner wall of 1
14 Groove in 13
15, 16 Surface on 1
17 Top side of 4
18 Recess in 4
19 Underside of 4
20 Outer wall of 4
21 Groove in 20
22 Inner wall of 4
23 Groove in 22
24 Groove bottom of 21
25, 26 Bevel on 24
27 Corner region of 1
28 Transverse leg of 1
29 Lower spar of 1
30 Inlet region of 11
31 Outlet region of 11
32 Tapped hole
33 Longitudinal leg
34 Transition region
35, 36 Longitudinal spar of 33
37 Groove bottom of 14
38, 39 Bevel on 37
40 Weld in 14
41 Clearance space between 1 and 4
42 Gap
43 Widened portion
44 Locking stud
45 Threaded section
46 Offset
47 End region of 44
48 Cone
49 End region of 44
50 Thread
51 Lock nut
52 Top side of 2
53 Underside of 2
54 Elastic material
55 Diaphragm
56 Projection on 13
57 Top surface of 56
58 Surface on 1
59 Surface on 4
60 Further threaded section on 12
61 Tapped hole in 4
62 Tension screw
63 Damping means
64 Pressure screw
65 Pressure surface
66 Vibration bush

The invention claimed is:

1. A mold for the production of molded parts comprising:

a mold frame;

a mold insert including recesses defining molded parts to be formed, said mold insert being spaced a distance from said mold frame in such a manner as to define a clearance space therebetween, so that said mold frame and said mold insert are displaceable in a non-contact manner with respect to one another in a direction that is approximately perpendicular to a bearing surface of the mold;

vibration-damping means at least partially filling said clearance space to maintain the distance between said mold frame and said mold insert in a non-contact manner; and at least one first locking element passing through said clearance space and being mounted with play in three spatial directions in at least one of said mold frame and said mold insert.

2. A mold for the production of mold parts comprising:

a mold frame;

a mold insert including recesses defining molded parts to be formed, said mold insert being spaced a distance from said mold frame in such a manner as to define a clearance space therebetween, so that said mold frame and said mold insert are displaceable in a non-contact manner with respect to one another in a direction that is approximately perpendicular to a bearing surface of the mold;

vibration-damping means at least partially filling said clearance space to maintain the distance between said mold frame and said mold insert in a non-contact manner; and at least one first locking element passing said clearance space and being mounted with play in at least one of said mold frame and said mold insert;

wherein said first locking element is mounted with play in one of said mold frame and said mold insert in a first spatial direction and is mounted with play in the other of said mold frame and said mold insert in second and third spatial directions that differ from said first spatial direction.

3. The mold of claim 1, further comprising an offset formed in said mold insert for releasably receiving a portion of said first locking element.

4. The mold of claim 1, further comprising a step formed in said mold insert for releasably retaining a portion of said first locking element.

5. The mold of claim 1, further comprising a projection on said mold frame through which said first locking element removably extends.

6. The mold of claim 1, wherein said first locking element is a locking stud having a threaded section, and is mounted in a tapped hole in said mold frame.

7. The mold of claim 1, further comprising a second locking element for preventing a change in position of said first locking element.

8. The mold of claim 7, wherein said second locking element is a lock nut which sits on a thread of said first locking element and secures said first locking element to said mold frame.

9. The mold of claim 1, wherein said first locking element has a conical point that engages a conical hole in said mold insert.

10. The mold of claim 1, wherein said clearance space defines a gap between said mold insert and said mold frame which runs approximately perpendicular to the bearing surface of said mold.

11. The mold of claim 10, wherein said gap, as viewed in cross section, has widened portions and narrowed portions.

12. The mold of claim 10, wherein said gap, as viewed in cross section, has a rectangular, perpendicularly disposed region which is not penetrated by said mold frame and said mold insert.

13. The mold of claim 1 wherein at least a region of the clearance space is filled by injecting said vibration-damping means to adhesively bond said mold frame and said mold insert.

14. The mold of claim 13, wherein said mold insert is held in said mold frame by the adhesively bonded connections of said vibration-damping means.

15. The mold of claim 1, wherein said first locking element serves as a centering aid which produces a rigid, positive locking connection between said mold insert and said mold frame while the clearance space is being filled by the injection of said vibration-damping means.

16. The mold of claim 1, wherein said first locking element can be disengaged during maintenance and dismantling of said mold, such that said mold insert can be separated from said mold frame.

17. A mold for the production of molded parts comprising:

a mold frame;

a mold insert including recesses defining molded parts to be formed, said mold insert being spaced a distance from said mold frame in such a manner as to define a clearance space therebetween, so that said mold frame and said mold insert are displaceable in a non-contact manner with respect to one another in a direction that is approximately perpendicular to a bearing surface of the mold;

vibration-damping means at least partially filling said clearance space to maintain the distance between said mold frame and said mold insert in a non-contact manner; and at least one first locking element passing through said clearance space and being mounted with play in at least one of said mold frame and said mold insert;

wherein said mold insert has all-around play in the range of 0.5 mm to 1.5 mm relative to said mold frame during operation.

18. The mold of claim 1, wherein said mold insert can be pushed into a recess of said mold frame in a non-contact manner with a rectilinear movement while maintaining the clearance space.

19. A mold for the production of molded parts conspiring:

a mold frame;

a mold insert including recesses defining molded parts to be formed, said mold insert being spaced a distance from said mold frame in such a manner as to define a clearance space therebetween, so that said mold frame and said mold insert are displaceable in a non-contact manner with respect to one another in a direction that is approximately perpendicular to a bearing surface of the mold;

vibration-damping means at least partially filling said clearance space to maintain the distance between said mold frame and said mold insert in a non-contact manner; and at least one first locking element passing through said clearance space and being mounted with play in at least one of said mold frame and said mold insert;

wherein said vibration-damping means has a mixed viscosity in the range of 2000 to 6000 Mpa, a tensile strength in the range of 4 to 30 Mpa, a bond elongation in the range of 100% to 400%, a resistance to tear propagation in the range of 6 to 30 Mpa, and a density in the range of 0.9 to 1.3 g/cm$^3$.

20. The mold of claim 1, wherein an inner wall of said mold frame and an outer wall of said mold insert are spaced apart and are opposite to each other.

21. The mold of claim 1, wherein said first locking element is used as at least one of a pressure screw and a tensile screw for securing said mold insert in said mold frame.

22. The mold of claim 1, wherein said first locking element is a locking stud having a threaded section, and is mounted in a tapped hole in said mold insert.

23. A mold for the production of molded parts comprising:

a mold frame;

a mold insert including recesses defining molded parts to be formed, said mold insert being carried by said mold frame in such a manner as to define a clearance therebetween;

vibration-damping means at least partially filling said clearance to maintain said mold frame and said mold insert a predetermined distance apart in a non-contact manner; and at least one first locking element passing through said clearance space and being mounted with play in at least one of said mold frame and said mold insert in three spatial directions.

24. A mold for the production of molded parts comprising:

a mold frame;

a mold insert including recesses defining molded parts to be formed, said mold insert being carried by said mold frame in such a manner as to define a clearance therebetween;

vibration-damping means at least partially filling said clearance to maintain said mold frame and said mold insert a predetermined distance apart in a non-contact manner; and at least one first locking element passing through said clearance space, said first locking element being mounted with play in one of said mold frame and said mold insert in a first spatial direction, and mounted with play in the other of said mold frame and said mold insert in second and third spatial directions that differ from said first spatial direction.

25. A mold for the production of molded parts comprising:

a mold frame;

a mold insert including recesses defining molded parts to be formed, said mold insert being carried by said mold frame in such a manner as to define a clearance therebetween;

vibration-damping means at least partially filling said clearance to maintain said mold frame and said mold insert a predetermined distance apart in a non-contact manner; and at least one first locking element passing through said clearance space and being mounted with play in at least one of said mold frame and said mold insert;

wherein said mold insert has all-around play in the range of 0.5 mm to 1.5 mm relative to said mold frame during operation.

26. A mold for the production of molded parts comprising:

a mold frame;

a mold insert including recesses defining molded parts to be formed, said mold insert being carried by said mold frame in such a manner as to define a clearance therebetween;

vibration-damping means at least partially filling said clearance to maintain said mold frame and said mold insert a predetermined distance apart in a non-contact manner, said vibration-damping means having a mixed viscosity in the range of 2000 to 6000 Mpa, a tensile strength in the range of 4 to 30 Mpa, a bond elongation in the range of 100% to 400%, a resistance to tear propagation in the range of 6 to 30 Mpa, and a density in the range of 0.9 to 1.3 g/cm$^3$; and at least one first locking element passing through said clearance space and being mounted with play in at least one of said mold frame and said mold insert.

* * * * *

UNITED STATES PATENT AND TRADEMARK OFFICE

CERTIFICATE OF CORRECTION

PATENT NO. : 7,290,752 B2
APPLICATION NO. : 10/972960
DATED : November 6, 2007
INVENTOR(S) : Gottfried Keller It is certified that error appears in the above-identified patent and that said Letters Patent is hereby corrected as shown below:

Column 10

*Line 14*: please change "mold parts" to --molded parts--

*Line 28*: please add --through-- after "passing"

Column 11

*Line 45*: please change "conspiring" to --comprising--

Signed and Sealed this

Thirteenth Day of May, 2008

JON W. DUDAS
*Director of the United States Patent and Trademark Office*